INVENTORS
SANFORD M. MARCUS &
JOHN T. WALLMARK
BY Milton S. Winters
ATTORNEY

SHIFT REGISTER

INVENTOR.
SANFORD M. MARCUS &
JOHN T. WALLMARK
BY Milton S. Winters
ATTORNEY

United States Patent Office 3,070,711
Patented Dec. 25, 1962

3,070,711
SHIFT REGISTER

Sanford M. Marcus, West Collingswood, and John T. Wallmark, Princeton, N.J., assignors to Radio Corporation of America, a corporation of Delaware Filed Dec. 16, 1958, Ser. No. 780,893
8 Claims. (Cl. 307—88.5)

This invention relates to information handling devices, and more particularly, although in its broadest aspects not exclusively, to improved shift registers.

Shift registers are used extensively in electronic computers for storing information, converting information from serial to parallel form (and vice versa), and the like. In general, shift registers include a plurality of interconnected components or stages, wherein each stage usually includes at least one active element and circuitry for connecting that element to other stages. A novel shift register which eliminates the multiplicity of components and connecting circuitry has been disclosed in the copending application of Harwick Johnson and John T. Wallmark, Serial No. 723,882, filed March 25, 1958, for "Multielectrode Semiconductor Devices," and assigned to the assignee of the present invention. As described in the copending application, the multielectrode semiconductor device comprises a plurality of bistable elements, or stages, disposed along the length of an elongated body of single crystalline semiconducting material. Each element has a first stable state characterized by low current conduction and a second stable state characterized by high current conduction. The structure of the device is such that when any element, or stage, is in the high conduction state, an electrode of that element injects minority charge carriers into the body of material. (The charge carriers are minority charge carriers with respect to the body of material.) Shifting is accomplished by applying a voltage pulse between the ends of the body to establish an electric field. This field, intermittently applied, sweeps said minority charge carriers along the body to an adjacent element to trigger that element into the high conduction state. The element that was originally in the high conduction state reverts to the low conduction state when the minority charge carriers are swept away, and new minority carriers are prevented from entering therein. Inasmuch as interstage coupling takes place within the body of material, the need for external circuitry is minimized.

Some leakage of minority charge carriers takes place between elements in the high conduction state and elements adjacent thereto in the absence of an applied electric shift field. In some devices, such leakage can cause false triggering of an adjacent element if the leakage is of sufficient magnitude. Moreover, this leakage may be larger from some stages than from others. Also, some stages with a low turn-on current may be more sensitive to leakage than others. Therefore some of these devices may have to be discarded only because one stage is affected too extensively by leakage.

It is an object of the present invention to provide improved information handling devices in the form of shift registers.

Another object of the invention is to provide improved shift registers which require a minimum of interconnecting circuitry.

It is a further object of the present invention to provide improved multistage semiconductor switching circuits wherein the interstage coupling takes place through the semiconductor material.

Yet another object of the present invention is to provide improved shift registers which are compact in size and immune from false triggering due to interstage leakage.

According to the present invention, these limitations are overcome by connecting the external circuitry of each element, or stage, through a switching means. For convenience of explanation, consider the various stages as being paired off into "odd" and "even" numbered stages depending on their physical location. (Adjacent odd stages are separated by an even stage, and vice versa.) The switching means is adapted to effectively "disable" all odd stages at one time in the operating cycle, and to "disable" all even stages at another time in the cycle. When the electric field is applied across the body of material to transfer minority charge carriers, the switching means is simultaneously triggered. The switching means allows one or more stages to be more sensitive to leakage than was previously possible without impairing the proper functioning of the device. Tolerance of construction is thereby increased without reducing the reliability of operation.

The foregoing and other objects, advantages and novel features of this invention, as well as the invention itself, both as to its organization and mode of operation, may be best understood from the following description when read in connection with the accompanying drawing in which like reference numerals refer to like parts and in which.

Figures 1, 2, 3:
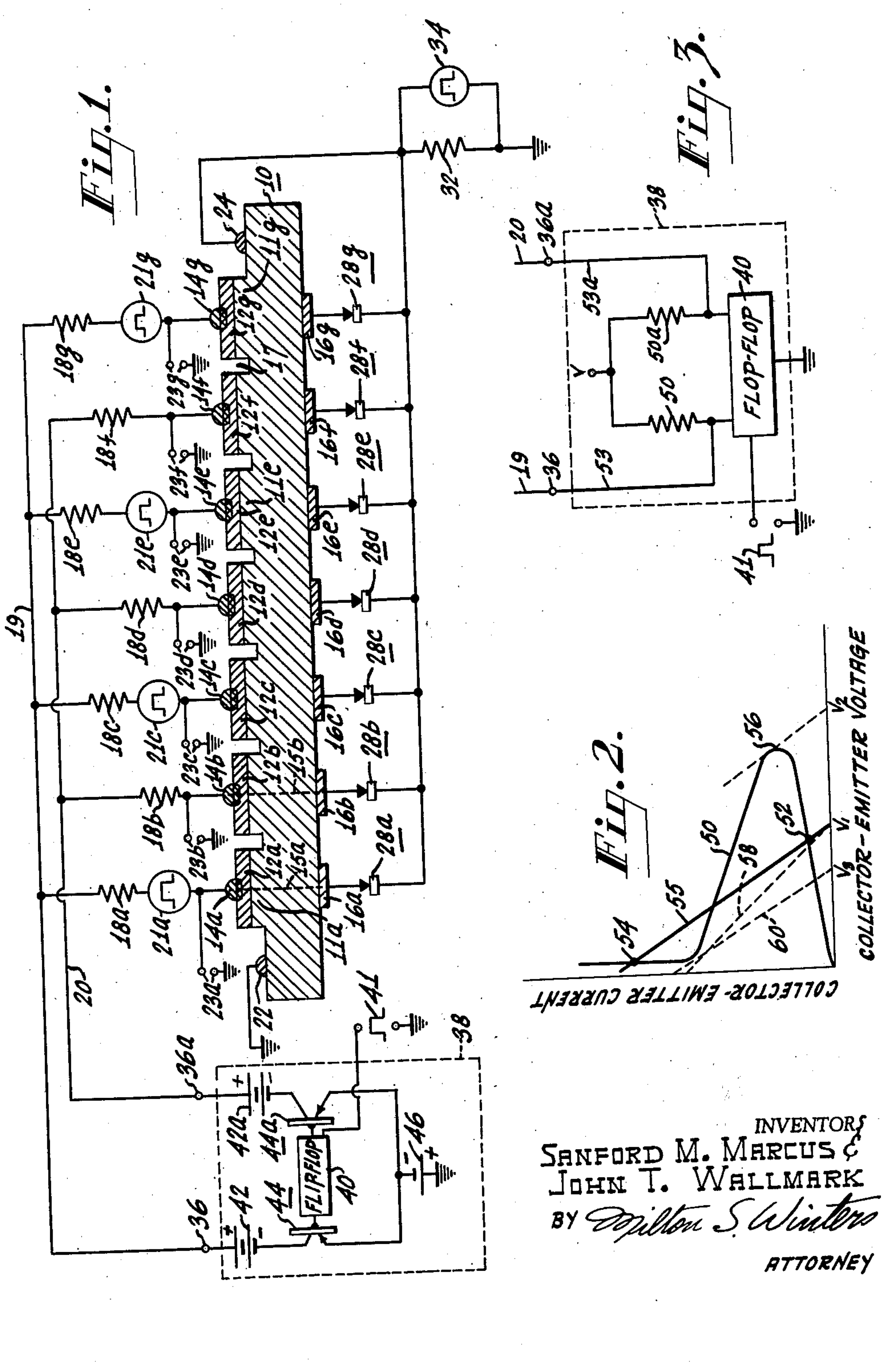
FIGURE 1 is an elevation view of a multielectrode semiconductor device in cross section and showing certain circuit components connected thereto to form an improved shift register according to the present invention.
FIGURE 2 is a graph showing the relation of collector-emitter current to collector-emitter voltage for each stage of the semiconductor device illustrated in FIGURE 1.
FIGURE 3 is a circuit diagram, partly in schematic and partly in block form, of a switching means suitable for practicing the present invention.

One embodiment of a shift register according to the present invention is illustrated in FIGURE 1. The semiconductor device comprises a plurality of similarly constituted transistor sections. In FIGURE 1 and the other drawings, like parts of the various sections are designated by like reference characters. Parts to which are applied numerical reference characters distinguished only by lower case alphabetic characters following the numerical character are similar to each other. In the description of the drawings, it will be understood that a description of one section or part will suffice as a description of all similar sections or parts, except where noted.

Each section is equivalent in structure to the thyristor described in the copending application of C. W. Mueller and L. E. Barton, Serial No. 677,295, filed August 9, 1957, Patent No. 2,968,751, entitled "Switching Transistor," and assigned to the assignee of the present invention. The semiconductor device of FIGURE 1 comprises en elongated body 10 of single crystalline semiconductive material of a first conductivity type, such as germanium, having a plurality of plateau portions 11 along the length thereof. Different lengthwise portions of the body 10 serve as the collector region for each of the separate sections. Corresponding parts of the respective sections are indicated by the respective alphabetic characters *a*, *b*, etc. Only the first, or left hand, section as viewed in the drawing is described in detail, as the other sections are similar thereto. A layer 12*a* of semiconducting material of conductivity type opposite to that of the elongated body 10 is disposed on top of the first plateau portion 11*a*. If the germanium is P-type material, the layer 12*a*, which serves as the base region for the first section, may be N-type made, for example, by diffusing arsenic into the germanium. An emitter electrode 14a of the first conductivity type is in contact with the base region 12a. By way of example, the emitter electrode 14a may be made by alloying a lot of material composed of 99.6% indium and 0.4% aluminum into the base region 12a. The base region is separated from both the collector region 10 and the emitter 14a by rectifying barriers. The emitter electrode 14a is symmetrical about a plane 15a perpendicular to the longitudinal axis of the elongated body 10.

A special collector electrode means 16a, is connected to the elongated collector region 10. The electrode means 16a is preferably also disposed to be symmetrical about the plane 15a of symmetry of its cooperating emitter electrode 14a. Only planes 15a and 15b are indicated. The collector electrode means 16a and its associated emitter electrode 14a define a current carrying path for the first section, or stage. The collector electrode means 16a is adapted to collect majority charge carriers (majority with respect to the collector region 10) at predetermined low values of collector-emitter current, and to inject minority charge carriers into the adjacent portion of the collector region 10 when the collector-emitter current is higher than the aforesaid low value. In the embodiment, wherein the collector region 10 is of P-type conductivity, the collector electrode means 16a may comprise a drop of solder bonded to the collector region 10. The solder may be composed of a minor proportion of metal which is P-conductivity type determining impurity and the bulk portion being of metals which are neither N- nor P-type impurity with respect to the collector region. It has been found that a suitable solder for this use is composed of 49% lead, 49% tin, and 2% indium. Pure tin contacts have also proved satisfactory.

Adjacent plateaus 11 of the semiconductor device are separated by channels 17 of sufficient depth to penetrate into the collector region 10, thereby insuring that the collector region provides the only common path between adjacent sections. These channels are provided along the entire length of the elongated body for as many sections as may be desired. The number of sections shown in FIGURE 1 is illustrative only. A suitable method of manufacturing the semiconductor device described above is set forth in the above-mentioned copending application of Harwick Johnson and John T. Wallmark. Various changes may be made in the construction of the semiconductor device without materially changing the operation thereof. Although the semiconductor device has been described as comprising a plurality of PNP sections, it will be apparent to one skilled in the art that an NPN configuration may be used to practice the present invention provided, of course, that the polarities of the various voltages and diodes hereinafter described are also reversed. Each section of the semiconductor device will hereinafter be referred to as a switching transistor for purposes of convenience.

A pair of electrodes 22, 24 are disposed at opposite ends of the elongated body 10 and in ohmic contact therewith. The left electrode 22 is connected to a point of suitable reference potential, such as circuit ground. The right electrode 24 is connected through a resistor 32 to the reference point. A source 34 of shift pulses is connected in parallel with this resistor 32. An electric field is established between the ends of the elongated body 10 (and across the collector regions of the various sections) when a shift pulse is applied to the circuit. The pulse should be of such polarity as to sweep minority charge carriers in the direction of desired shift. If the collector region 10 is of P-type conductivity, for example, a shift pulse making the right shift electrode 24 more positive than the left shift electrode 22 will shift minority charge carriers (electrons in this case) to the right. In order to prevent the shift pulse from being shorted through the collector electrode means 16a . . . *g*, the latter means may be connected, respectively, through diodes 28a . . . *g* to the right shift electrode 24. The diodes 28 are poled in such a direction as to be back-biased in response to applied shift pulses.

The emitter electrodes 14a, *c*, *e*, *g*, of odd-numbered sections (counting from the left), are connected through separate resistors 18a, *c*, *e*, *g*, respectively, to an energizing line 19. The emitter electrodes 18b, *d*, *f*, of all even-numbered sections are connected through separate resistors 18b, *d*, *f*, respectively, to a different energizing line 20. The energizing lines 19, 20 are connected to terminals 36, 36a, respectively, of a switching means 38. In the switching means, the energizing lines 19, 20 are connected to the positive terminals of biasing sources 42, 42a, respectively. These biasing sources are indicated schematically as batteries. The negative terminals of the biasing sources 42, 42a are connected to a switch comprising two transistors 44, 44a and a flip-flop 40. The transistors 44, 44a may be switching transistors of the type described in the aforementioned copending application of C. W. Mueller and L. E. Barton. As described in that copending application, the switching transistor has a very low impedance when operated in its high conduction state, and a high impedance when operated in its low conduction state. The operating states of the transistors 44, 44a are controlled by the flip-flop 40, whose outputs are connected to the base electrodes of the transistors 44, 44a. The collector electrodes of the transistors 44, 44a are connected to the negative terminals of the biasing sources 42, 42a, respectively. The emitter electrodes are each connected to the negative terminal of an emitter biasing source 46, the positive terminal of which is connected to the reference point.

The arrangement of the flip-flop 40 and emitter biasing source 46 is such that, at any one time, one of the switching transistors 44, 44a is in the high conduction mode while the other switching transistor is in the low conduction mode. Stated in another way, the negative terminal of one biasing source 42, 42a is connected to the reference point through a very low impedance while the negative terminal of the other biasing source is connected to the reference point through a high impedance. The operating states of the transistors 44, 44a are reversed each time a pulse 41 is applied to trigger the flip-flop 40. The trigger pulse 41 may be derived from the shift pulse source 34. In any event, the trigger pulse 41 and the shift pulse occur substantially in simultaneity.

It will be apparent from the description of FIGURE 2 that other types of switches may be used in the embodiment of FIGURE 1. One other type of switch is shown in FIGURE 3 and will be described hereinafter. The operation of each switching transistor of the semiconductor device may be best understood with reference to FIGURE 2. The relation of collector-emitter current to collector-emitter voltage is illustrated by curve 50. It should be noted that each switching transistor has an inherent negative resistance characteristic. It is this characteristic that allows a switching transistor to be operated as a bistable element. At low values of collector-emitter voltage a switching transistor operates somewhat like an ordinary transistor with collector-emitter current increasing gradually with increasing collector-emitter voltage. If the collector-emitter voltage is made high enough, a transition point 56 is reached whereat a breakdown in resistivity occurs due to avalanche effect, and the current jumps abruptly to a high value. In the embodiment of FIGURE 1, a switching transistor may be considered as storing one bit, that is, a binary digit of information, for example, a binary "one" when that transistor is in the high conduction state, and a binary "zero" when that transistor is in the low conduction state.

When a resistor of the proper value, such as resistor 18a, is connected in series with the emitter electrode 14a, two stable operating conditions are possible corresponding, for example, to the point 52, 54 at the intersections of a load line 55 and the curve 50. The slope of the load line 55 is determined primarily by the value of the resistor 18a. Intersection 54 designates the stable high conduction state and intersection 52 the stable low conduction state of the stage. The switching transistor may be triggered from the low to the high conduction state in several ways. For example, a voltage pulse of the proper polarity may be applied in series with the collector-emitter path to raise the voltage to a value $V_2$, which is sufficient to exceed the breakdown, or transition point 56. The switching transistor may also be triggered to the high conduction state by injecting into its collector region 10 charge carriers which are minority charge carriers with respect to the collector region, or by injecting into the base region 12a charge carriers which are minority charge carriers with respect to the base region. The switching transistor may be triggered from the high to the low conduction state by lowering the collector-emitter voltage to a value, such as $V_3$, such that the load line 60 has only one intersection with the curve 50. Alternatively, the switching transistor may be triggered from the high to the low conduction state by adding resistance in series with the collector-emitter path to change the slope of the load line so that it has only one intersection with the curve 50. The latter condition is illustrated by the load line 58. A switching transistor in the high conduction state may also be triggered to the low conduction state by sweeping the minority charge carriers out of the collector region 10. The above-described triggering methods may be variously used in operating the shift register illustrated in FIGURE 1.

The value of the resistor 18a in the first stage (and all odd-numbered stages) is selected so that the first stage has two stable states corresponding to the two intersections 52, 54 of the load line with the curve 50 when the left transistor 44 of the switching means 38 is in the high conduction state. Under these conditions, the first stage may be triggered to the high conduction state by any of the aforementioned methods. When the left transistor 44 is in the low conduction state, its impedance is high, and the load line for the first stage (and all odd-numbered stages) has only one intersection with the curve 50. Under these conditions, the first stage (and all odd-numbered stages) has only one stable state. The arrangement of the switching means 38 prevents two adjacent stages from conducting heavily at the same time, and eliminates the possibility of false triggering due to leakage of minority charge carriers. Therefore, if one desires to store *n* binary digits in the shift register, a $2n-1$ stage shift register may be used. However, adjacent stages may be spaced in very close proximity to each other by using an arrangement such as that illustrated with the switching means 38.

Information may be entered into the shift register either serially or in parallel form. When the shift register is used as a serial device, the information signals are preferably applied to the first, or left hand switching transistor. The information signals may be applied between the emitter electrode 14a and resistor 18a as from a pulse source 21a. Alternatively, the signals may be applied between the emitter electrode 18a and the base region 12a. If the left transistor 44 of the switching means 38 is conducting heavily, the first switching transistor is triggered into the high conduction state in response to an applied information signal corresponding, for example, to a binary "one." The collector electrode means 16a then injects minority charge carriers into the adjacent portion of the collector region 10.

Assume that the first stage is in the high conduction state in response to an applied binary "one" signal. Shift pulses from the pulse source 34 are applied periodically between the end electrodes 22, 24. Simultaneously, trigger pulses 41 are applied to the flip-flop 40 to reverse the states of the transistors 44, 44a in the switching means 38. Each shift pulse establishes an electric field between the ends of the collector region 10 and causes the minority charge carriers to be swept to the right. Each shift pulse is of such amplitude and duration as to sweep the minority charge carriers from one stage to an adjacent stage. The shift pulses occur at twice the frequency at which information signals are applied to the shift register. The first shift pulse sweeps minority charge carriers to the second switching transistor to trigger that transistor to the high conduction state. The first switching transistor then revers to the low conduction mode. The second shift pulse sweeps the minority charge carriers from the second to the third switching transistor to trigger the third transistor to the high conduction state. The first switching transisor is then in the low conduction mode and ready to receive a second information signal. This process is repeated until the complete binary number has been stored in the odd numbered positions of the register. The shift pulse source 34 may then be disabled.

Assume now that the first stage is initially in the low conduction state. Assume further that a binary "zero" signal, represented by the absence of an input pulse, is applied to the first stage. The first stage does not trigger to the high conduction state in response to the applied binary "zero" signal and, therefore, no minority carriers are injected into the collector region 10 by the collector electrode means 16a. When a shift pulse is now applied between the shift electrodes 22, 24, no minority charge carriers are swept to the second stage to trigger that stage to the high conduction state. Consequently, this stage remains in the low conduction state. In a similar manner, the third stage remains in the low conduction state in response to the next shift pulse.

A binary number may also be entered into the shift register in parallel form by applying information signals directly to the odd-numbered switching transistors from the pulse sources 21a, c, e, g. The stored information may be read out of the register in parallel form at the output terminals 23a, c, e, g. Alternatively, the information may be read out of the register serially at the output terminal 23g by applying a series of shift pulses to the end electrodes 22, 24, and simultaneously triggering the flip-flop 40.

The shift register illustrated in FIGURE 1 may also be used to provide a series of time-spaced pulses in response to each input pulse applied, for example, to the first shifting transistor. When the device is used in this manner, the frequency of the shift pulse source 34 should be at least *n* times greater (*n* being the number of stages) than the frequency at which input pulses are applied. Successive time-spaced pulses may be derived from the output terminals 21a . . . 21g, respectively.

Another type of switching means 38 suitable for practicing the present invention is illustrated in FIGURE 3. The switching means 38 comprises a flip-flop 40 connected to a source of voltage V through separate resistors 50, 50a. When the flip-flop 40 is in one of its two stable states, voltages $V_1$ and $V_3$ appear on the output leads 53, 53a and at the output terminals 36, 36a, respectively. The voltages on the output leads 53, 53a reverse when the flip-flop 40 is triggered to its other stable state in response to an applied trigger pulse 41. As may be seen by referring to FIGURE 2, the load line 55 corresponding to a voltage $V_1$ has two intersections with the curve 50, whereas the load line corresponding to a voltage $V_3$ has only one intersection with the curve. The energizing lines 19, 20 are connected to the output terminals 36, 36a, respectively.

Figure 4:
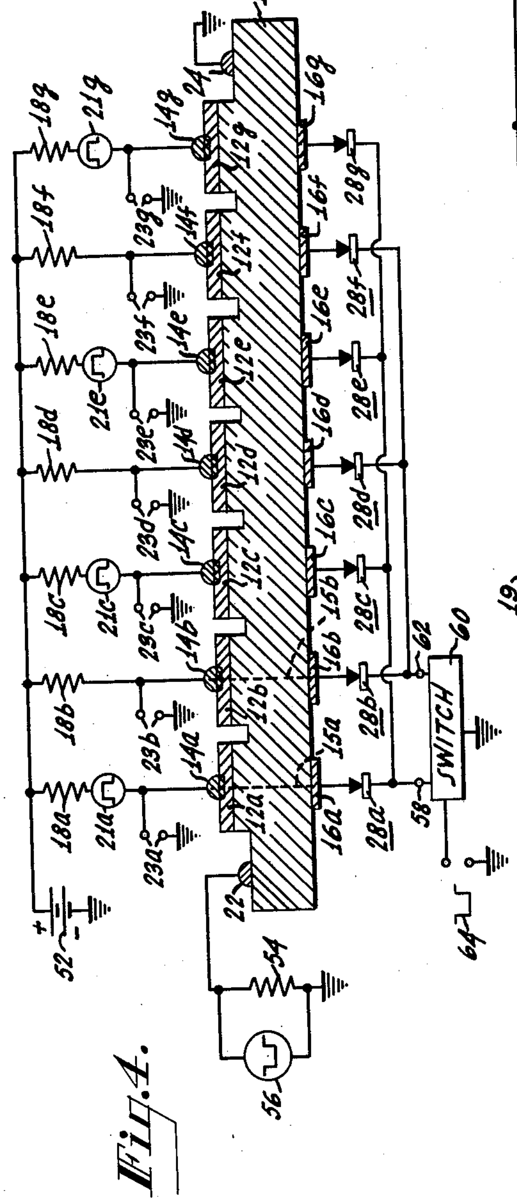
FIGURE 4 is a diagram of another embodiment of the shift register according to the invention.

Another embodiment of a shift register according to the invention is illustrated in FIGURE 4. In this embodiment, each of the emitter-electrodes 14a . . . g is connected through a separate resistor 18a . . . g to a biasing source 52. Odd-numbered collector electrode means 16a, c, e, g are connected to one terminal 58 of a switch 60. Even-numbered collector electrode means 16b, d, f are connected to another terminal 62 of the switch. Th switch 60 may be of the type shown in FIGURE 1 and comprising two transistors and a flip-flop. In one state, the switch 60 presents a very high impedance between terminal 58 and reference ground, and at the same time provides a very low impedance between the other terminal 62 and reference ground. The state of the switch is reversed each time a trigger pulse 64 is applied to the switch.

The left shift electrode 22 is connected through a resistor 54 to reference ground. A source 56 of trigger pulses is connected in parallel with the resistor 54. The right shift electrode 24 is connected directly to reference ground. The pulses from the pulse source 56 are of such polarity as to sweep minority charge carriers to the right. This shift register is similar in construction to the shift register illustrated in FIGURE 1, except for the changes noted above. The operation is also similar and will be understood by those skilled in the art from the foregoing description of the operation of the shift register of FIGURE 1.

Figure 5:
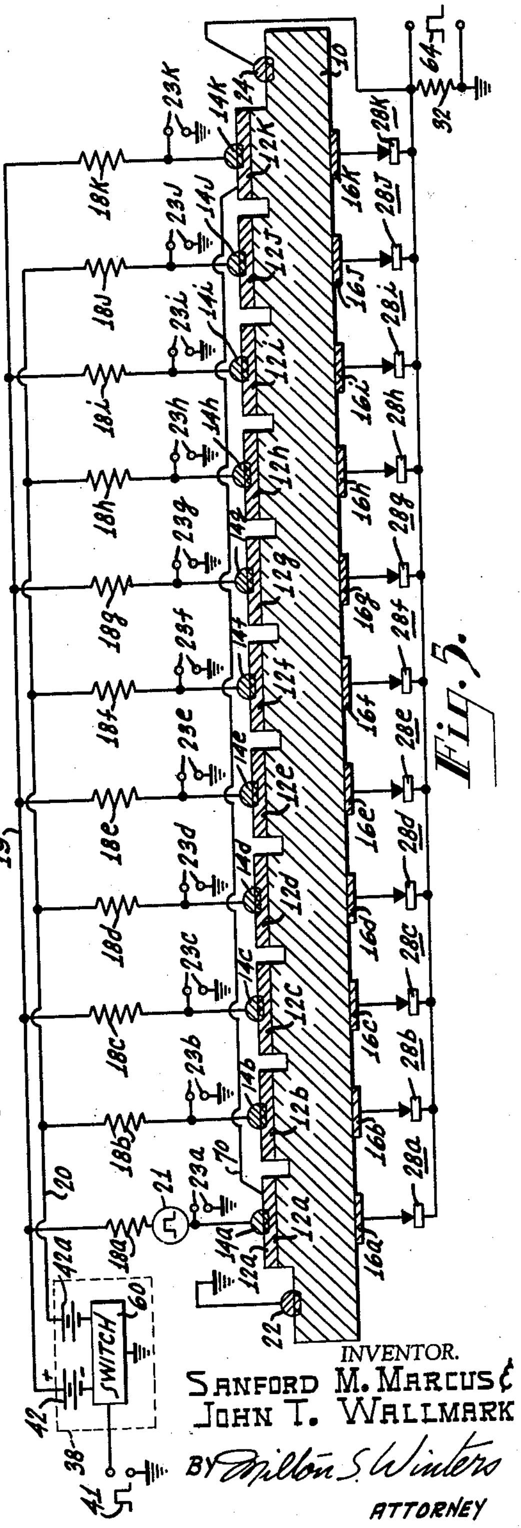
FIGURE 5 is a schematic diagram of a ring counter according to the present invention.

A ring counter according to the present invention is illustrated in FIGURE 5. This embodiment is substantially similar to the shift register illustrated in FIGURE 1 and described previously. When the counter is initially placed in operation, a voltage pulse 21 is applied to the first switching transistor to trigger that transistor to the high conduction state. The voltage pulse may be applied between the emitter electrode 14*a* and the load resistor 18*a*. Alternatively, the pulse may be applied between the emitter electrode and the base region 12*a*. The collector electrode means 16*a* of the first switching transistor injects minority charge carriers into the adjacent portion of the collector region 10 in response to an applied pulse 21. When a first shift pulse 64 is applied between the shift electrodes 22, 24, the minority charge carriers are swept to the collector region of the second switching transistor. A trigger pulse 41 is simultaneously applied to a switch 60 located within the switching means 38. In response to the trigger pulse, the switch 60 enables the second switching transistor to be triggered to the high conduction state by the injected minority charge carriers. The first switching transistor, in turn, reverts to the low conduction state. Successive shift pulses 64 and simultaneously applied trigger pulses 41 cause minority charge carriers to be swept to the right to trigger successive switching transistors to the high conduction state.

When an $n$ position ring counter is desired, $n+1$ switching transistors may be provided. In the embodiment of FIGURE 5, a ten position ring counter is illustrated having eleven separate sections, or switching transistors. The first and last switching transistors operate in simultaneity. The base regions 12*a*, 12*k* of the first and last switching transistors are connected together through a lead 70 of negligible impedance. When either of these two switching transistors is in the high conduction state, base current therein causes the other switching transistor to be triggered to the high conduction state. Therefore, when the tenth switching transistor is in the high conduction state and a switching pulse 64 is then applied, the minority charge carriers are swept to the collector region 10 of the eleventh switching transistor to trigger that transistor into heavy conduction. The base current in the eleventh switching transistor causes the first transistor also to be triggered to the high conduction state. The shifting cycle is then repeated.

Separate output terminals 23*a* . . . 23*j* are connected to the emitter electrodes 14*a* . . . 14*j*, respectively. Output pulses appear successively at these terminals in timed sequence in accordance with the application of shift pulses 64. These time-spaced output pulses may be used, for example, as timing pulses in a multiplexing system. It is apparent from the preceding description that an output pulse will be obtained at any one output terminal in response to every $n^{th}$ switch pulse 64.

There has thus been shown and described an improved shift register which requires a minimum of interconnecting circuitry, and which is compact in size, reliable in operation, and immune from false triggering due to interstage leakage. By way of example, a ten stage shift register has been constructed and successfully operated wherein the dimensions of the elongated body 10 are approximately as follows:

Length=0.500 inch
Height=0.005 inch
Thickness=0.020 inch

What is claimed is:

1. In combination: an elongated body of one conductivity type semiconducting material; a plurality of regions of conductivity type opposite said one type spaced from one another successively along the length of said body and in rectifying contact therewith; a like plurality of electrodes each in rectifying contact with a different one of said regions; a like plurality of electrode means affixed to said body, each different one of said electrode means and a corresponding one of said electrodes defining a current carrying path through a corresponding one of said regions and through said body which is located symmetrically with respect to its associated said region; switching means serially connected with each said path, said switching means having two states and being arranged to enable alternate current carrying paths to conduct more current than a predetermined low value of current and to prevent the others of said paths from conducting more current than said low value when said switching means is in one of said states; and means for causing said switching means to change from said one state to the other.

2. The combination set forth in claim 1 including means for establishing intermittently an electric field within said body and along the length thereof.

3. The combination set forth in claim 1 including a pair of electrodes respectively affixed to opposite ends of said body, and means for applying an energizing signal across said pair of electrodes.

4. In combination: a plurality of semiconductor elements each including an emitter, a base in rectifying contact with said emitter, a collector region in rectifying contact with said base, and a collector electrode means in contact with said collector region; means connecting the collector regions in a series path; switching means serially connected with each said emitter and its associated collector electrode means, said switching means having two states and being arranged to enable heavy conduction through alternate ones of said semiconductor elements and to prevent heavy conduction through the others of said semiconductor elements when said switching means is in one of said states; means for changing the operating state of said switching means; and means connected across the ends of said path for establishing an electric field across said collector regions in the direction of said path in synchronism with each change of state of said switching means.

5. In combination: an elongated body of semiconducting material; a plurality of bistable semiconductor elements spaced along said body and each including a separate emitter electrode, a base electrode in rectifying contact with said emitter electrode, a collector region in rectifying contact with said base region, and a collector electrode means in contact with said collector region, each said collector region comprising a different lengthwise portion of said body, each said emitter electrode and corresponding collector electrode means defining a current carrying path through the corresponding base and collector regions which is located symmetrically with respect to adjacent said base regions; switching means serially connected with each said current carrying path, said switching means having two states and being adapted to apply a voltage greater than a predetermined value to alternate ones of the paths and to apply a voltage less than said predetermined value to the others of said paths when said switching means is in one state; means for causing said switching means to change from said one state to the other; and means for applying an electric field lengthwise along said body in synchronism with each said switching means change.

6. In combination: a plurality of semiconductor elements comprising a like plurality of collector regions of one conductivity type semiconducting material connected in series, a like plurality of base regions of opposite conductivity type material each in rectifying contact with a different one of said collector regions, a like plurality of emitter electrodes of said first type material each in rectifying contact with a different one of said base regins, a like plurality of collector electrode means each in contact with a different one of said collector regions and, together with the emitter electrode of the same one of said elements, defining a current-carrying path through said base and collector regions of the same one of said elements; switching means serially connected with each said path, said switching means having two states and being dapted to add a first impedance in series with alternate ones of the paths and to add a second, different impedance in series with the others of the paths when said switching means is in one of said states; means for changing the state of said switching means; and means connected across the ends of said series of collector regions for establishing, in each of said collector regions, an electric field in a direction substantially normal to the associated said path, in synchronism with each said switching means change.

7. In combination: a body of semiconducting material; a plurality of transistors, each of said transistors having an emitter electrode and a collector electrode means defining a current carrying path, each of said transistors including a different portion of said body; a pair of electrodes respectively affixed to opposite ends of said body; switching means serially connected with each said current carrying path, said switching means having two states and being adapted to apply a voltage greater in magnitude than a predetermined value to alternate ones of the paths and to apply a voltage of lesser magnitude than said predetermined value to the others of said paths when said switching means is in one of said two states; means for causing said switching means to change from said one state to the other; and means for applying an energizing signal across said pair of electrodes when the state of said switching means is caused to change.

8. In combination: an elongated body of semiconducting material; a plurality of semiconductor elements each including a different lengthwise portion of said body, each of said semiconductor elements having a first stable state characterized by high current conduction and a second stable state characterized by low current conduction, each of said semiconductor elements further including an individual electrode means associated therewith and affixed to said body, each said electrode means being adapted to inject into its associated said body portion charge carriers which are minority charge carriers with respect to said body when its associated semiconductor element is in said first state; switching means connected with each of said semiconductor elements, said switching means having two states and being adapted to enable alternate ones of the electrode means to inject minority charge carries into said body and to prevent the others of said electrode means from injecting minority charge carriers into said body when said switching means is in one of said two states; means for causing said switching means to change from said one state to the other; means for triggering selected, alternate said semi-conductor elements whereby corresponding said electrode means inject said minority change carriers into said body; and means for momentarily establishing an electric field between the ends of said body when the state of said switching means is changed.

References Cited in the file of this patent

UNITED STATES PATENTS

| | | |
|---|---|---|
| 2,801,348 | Pankove | July 30, 1957 |
| 2,877,358 | Ross | Mar. 10, 1959 |